United States Patent [19]
Atalla

[11] Patent Number: 5,832,287
[45] Date of Patent: *Nov. 3, 1998

[54] WIDEBAND ON-DEMAND VIDEO DISTRIBUTION SYSTEM AND METHOD

[76] Inventor: Martin M. Atalla, 18 Monte Vista Ave., Atherton, Calif. 94025

[ * ] Notice: The term of this patent shall not extend beyond the expiration date of Pat. No. 5,564,107.

[21] Appl. No.: 273,334

[22] Filed: Jul. 11, 1994

[51] Int. Cl.$^6$ .................................................... G06F 15/00
[52] U.S. Cl. ............... 395/800; 395/200.03; 395/200.12; 395/200.2; 380/20
[58] Field of Search ................................... 395/800, 500, 395/200, 200.03, 200.12, 200.2; 380/20

[56] References Cited

U.S. PATENT DOCUMENTS

| | | | |
|---|---|---|---|
| 3,602,891 | 8/1971 | Clark et al. | 395/200.03 |
| 4,868,866 | 9/1989 | Williams, Jr. | 340/825.31 |
| 5,027,400 | 6/1991 | Baji et al. | 380/20 |
| 5,129,077 | 7/1992 | Hillis | 395/500 |
| 5,289,497 | 2/1994 | Jacobson et al. | 375/200 |

*Primary Examiner*—Alyssa H. Bowler
*Assistant Examiner*—John T. Follansbee
*Attorney, Agent, or Firm*—Fish & Richardson P.C.

[57] ABSTRACT

A system and method for distributing video or audio or other interactive program information to multiple users includes master files of such program information that can be selectively distributed to community systems in which individual users are selectively coupled with computing microcells that process the selected program information from within the entire set of programs that are all contained in moving memory modules which cyclically and recurringly distribute the entire set of programs to multiple computing microcells. A microcell access switch controls coupling of users to computing microcells, and controls selective interaction between master files and moving memory modules for updating the set of programs stored therein. The microcell access switch provides network programs to users without requiring a computing microcell for enhanced versatility and reduced system costs.

11 Claims, 9 Drawing Sheets

WIDEBAND ON-DEMAND VIDEO DISTRIBUTION SYSTEM AND METHOD

RELATED APPLICATIONS

The subject matter of this application is related to the subject matter of pending application Ser. No. 07/928,917 filed on Aug. 12, 1992 by M. M. Atalla, now abandoned in favor of continuing application Ser. No. 08/341,303 filed on Nov. 16, 1994, which subject matter is incorporated herein by this reference.

FIELD OF THE INVENTION

This invention relates to distributed computer-oriented systems, and more particularly to a system for distributing video information from master files through community servers to multiple users over high speed digital data links.

BACKGROUND OF THE INVENTION

The increased interest in obtaining simultaneous access to large files of video information for a large number of users has created a need for a new computing system architecture. The number of simultaneous users that a conventional computer can serve is limited by the access time to data that is stored on a mass memory such as a rotating disk. Typical access times for large disk systems is 20 milliseconds with a data transfer rate of 200 MByte/sec. System performance is limited by the number of simultaneous users that can access data in video storage units. This places a limit of about 100 users per copy of the video information. The need alternatively to duplicate copies of video information is a major reason for the high cost per video stream for conventional systems.

SUMMARY OF THE INVENTION

In accordance with the present invention, simultaneous access to video information is provided to a large number of users. The access time is not limited by the number of users who are requesting data, but rather the access time is limited by the cycle time of moving memory modules, as later described herein. The access time is fixed for an arbitrary large number of video streams, and the cost per video stream is therefore greatly reduced.

DESCRIPTION OF THE DRAWINGS

FIGS. 5 A–C are pictorial illustrations of various bus data formats in the operation of the present invention;

DESCRIPTION OF THE PREFERRED EMBODIMENT

Figure 1:
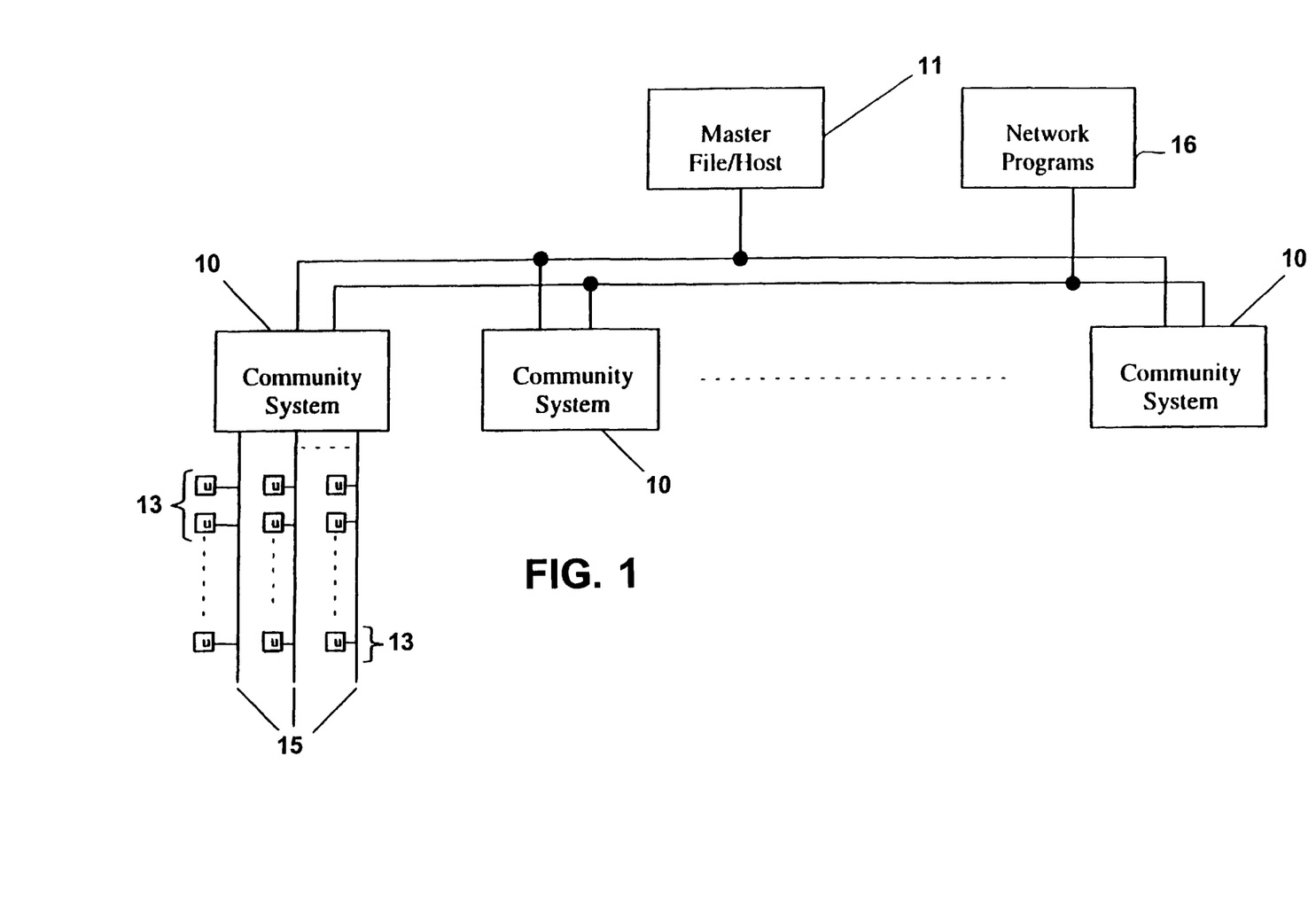
FIG. 1 is a block schematic diagram of a computer-oriented distribution system according to the present invention.

Referring now to FIG. 1, the video distribution includes a master file 11 of video information which may be movies, interactive educational programs, and other interactive video programs. Of course, the master file 11 may also include audio programs for distribution in the same manner as described herein for video information. The master file 11 distributes the video programs to the community systems 10 as requested by the users 13. The community system 10 only stores the number of video programs that are actively being used, which may be in the order of 100 two-hour programs. A community system 10 may serve 10,000 users 13, and ten such community systems 10 may be served by one master file 11. Each community system 10 may have direct connection to each user 13, or have 100 serial high-speed digital data links 15 to provide the video programs to 100 users on each high-speed digital data link 13 or have a combination of direct user connection and high-speed digital data links with a reverse channel for communicating the commands and data to the community system 10 from the users 13.

Figure 2:
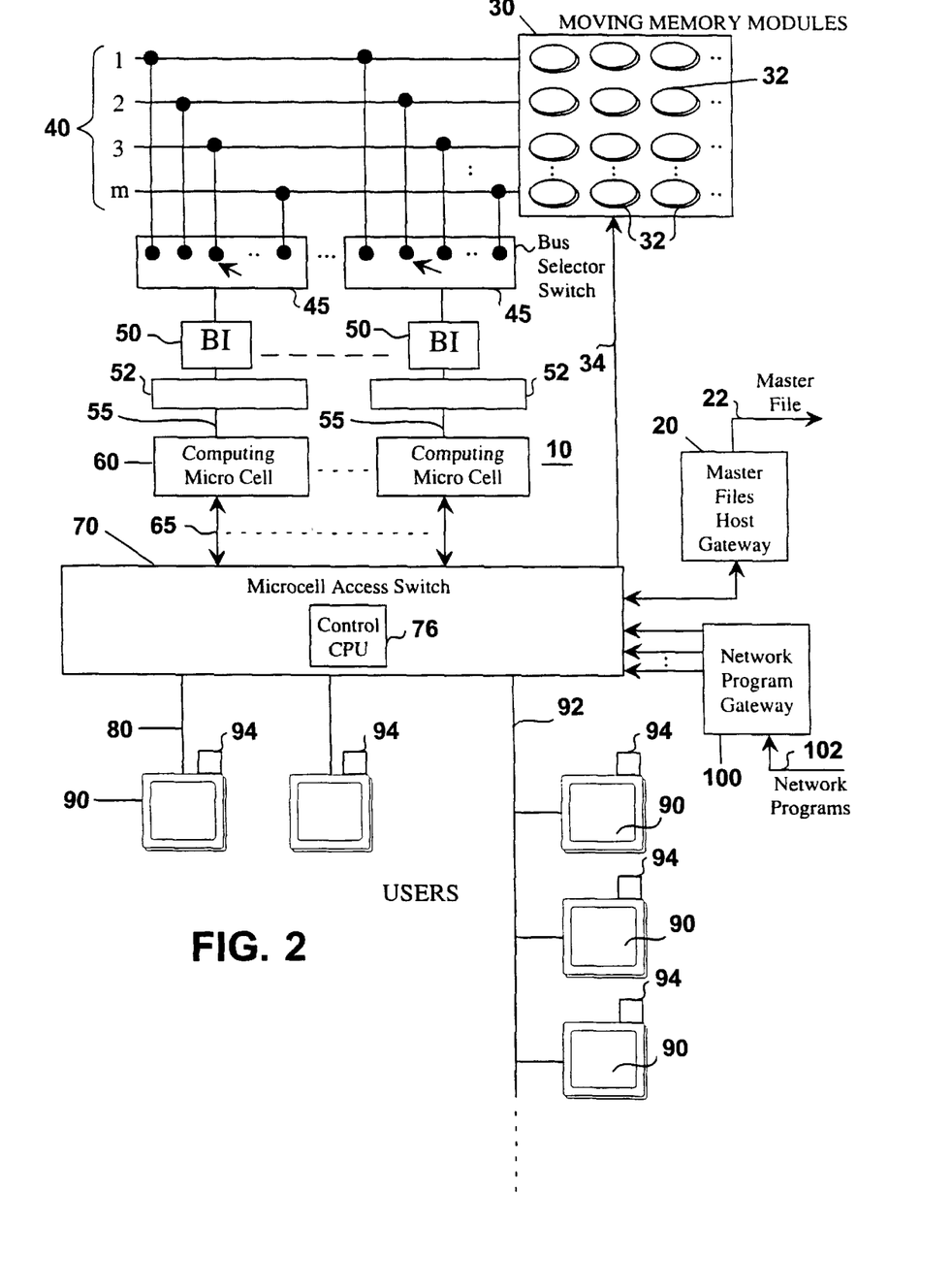
FIG. 2 is a block schematic diagram of a community system for serving multiple users.

Referring now to FIG. 2, there is shown a block diagram of a community system 10 which includes a master file gateway 20 arranged for coupling between the master file 11 and the microcell access switch 70. In addition, a network program gateway 100 is also arranged for coupling a plurality of broadcast network programs to the microcell access switch 70. The microcell access switch directly connects 80 to multiple users 90, or connects to multiple users 90 via a high-speed, time-division multiplexed data link 92 of conventional design which can serve many users substantially simultaneously.

The microcell access switch 70 also connects to the moving memory module (MMM) 30 which includes a plurality of mass-memory, magnetic-disk storage devices 32. These storage devices 32 couple the stored contents thereof to a plural number of conductors of the moving memory buses 40, which buses can be selected by the microcells using a bus selector switch 45. Each bus selector switch 45 is connected to a bus interface module 50 which in turn connects to an associated computing microcell 60 which, in turn, is also connected to the microcell access switch 70. The moving memory modules 30 repetitively cycle through one or more program segments and transmit the program segments over the moving memory bus 40.

System Operation

When a user desires to access the system to view a video or audio program or video game, or the like, two operational categories exist, as illustrated and described later herein with reference to FIG. 4, namely:

1) Video on demand for video or audio programs or video games, and 2) network programs for video or audio programs.

Network programs include any program that is transmitted in real time, or a program with which the user cannot interact (e.g., via fast forward, pause, start, or the like).

Video-on-demand programs are those with which the user can specify the starting time of the program, and can interact with at least the normal controls (e.g. fast forward, pause, and the like) of a video tape player. There can be a large variety of interactive programs such as computer-aided instruction programs where the student and program can have extensive interaction. Also, a high degree of interaction is included in "virtual reality" systems where the user is placed in a created situation that is manipulated via computer programs and movements of the user or manual controls.

The network programs category requires the ability to select which program is to be accessed, while the video-ondemand category typically requires a more extensive response channel or reverse-communication channel to provide the requisite levels or degrees of interaction between a user and the system. Most video-on-demand applications require only modest reverse communication channel bandwidth to accommodate call ups and commands such as fast forward, pause, and the like, as described herein, for example, with reference to FIGS. 2 and 4.

The user access process begins when the user activates the system and requests a video or audio or other interactive program. In the case where the user desires to watch a network program, the system operates much like a conventional TV set in that the user selects a network channel, and the system forms connections to provide the video data required to view the selected network channel.

When the user wants to watch and interact with a stored video or audio program, the user's selection is transmitted via a reverse communication channel from the user to the microcell access switch 70. Such reverse communication bus or channel may be analogous, for example, to a telephone line and may be included in the direct connection 80 or in a time-division multiplexed (TDM) data link 92. A control central processing unit (CPU) 76 in the microcell access switch includes a table of video programs that are presently in a moving memory module 30. The control CPU 76 assigns a microcell 60 to the user and provides the microcell 60 with the address of the video program. Such address includes which moving memory bus 40, and the location within the repetitive cycle of the information that recurringly appears on the moving memory bus 40 where the program starts. The bus interface 50 reads segments of selected program data from the moving memory bus 40 into a buffer memory 52. The microcell 60 transmits the program (video or audio) data at a lower data rate to the microcell access switch 70 which provides a connection 80, or 92 to the user 90. The microcell 60 also receives commands from the user on a reverse communication bus as previously described to control the interaction. For example, if the user wanted to fast forward the video program by a factor of four, the microcell reads every fourth frame of data from the buffer memory as it constructs the program data from the buffer 52 to send to the user. If the user wanted to play a video program in slow motion, the microcell 60 reads each frame from the buffer memory 52 a multiple number of times before advancing to the next frame of data in the buffer memory 52.

When a user requests a video program that is not in the community system video program file, as determined by the control CPU 76 of the microcell access switch 70, the CPU 76 requests the video program from the master file/host gateway 20. The data channel 22 between the master file/host gateway 20 and the master file 11 may operate at a standard Synchronous Optical Network (SONET) OC-12 rate of 622.08 mbits/sec, which is capable of transferring a two-hour program in about 20 seconds. The master file gateway 20 obtains the desired video program from the master file 11 and loads it into a MMM 30 via the microcell access switch 70, and thereby replaces a video program in the MMM 30 that has not been used for the longest period, simply by overwriting or recording over the previously stored program recording.

Moving Memory Modules

The moving memory modules 30 are used to store active video or audio or other interactive programs and to distribute them to the computing microcells 60. Each MMM 32 repetitively cycles through its contents and broadcasts or distributes the data on the moving memory bus (MMB) 40 to all computing microcells 60 simultaneously. As an example, with a MMB rate of 250 Mbyte/sec, and an average access to set up a video program of about 30 seconds, the requisite capacity of each MMM 32 is about 15 Gbytes. The MMM 32 may be a single high-capacity disk or several lower-capacity disks 32. Using the Motion Pictures Expert Group (MPEG) standard MPEG-I for compressed video of 1.5 mbit/sec, a typical two-hour program occupies about 1.35 Gbytes of memory. A MMM 32 of 15 Gbytes memory capacity can contain 11 two-hour program segments. Nine 15 Gbyte MMMs 32 would be required to store, say, the 100 two-hour program segments. The MMM 30 also receive new programs via the microcell access switch 70, communication link 34, and the master file gateway 20 via a serial communication link 22 that operates at the 622.08 mbit/sec rate between the community system 10 and the master file 11.

Figure 5A:
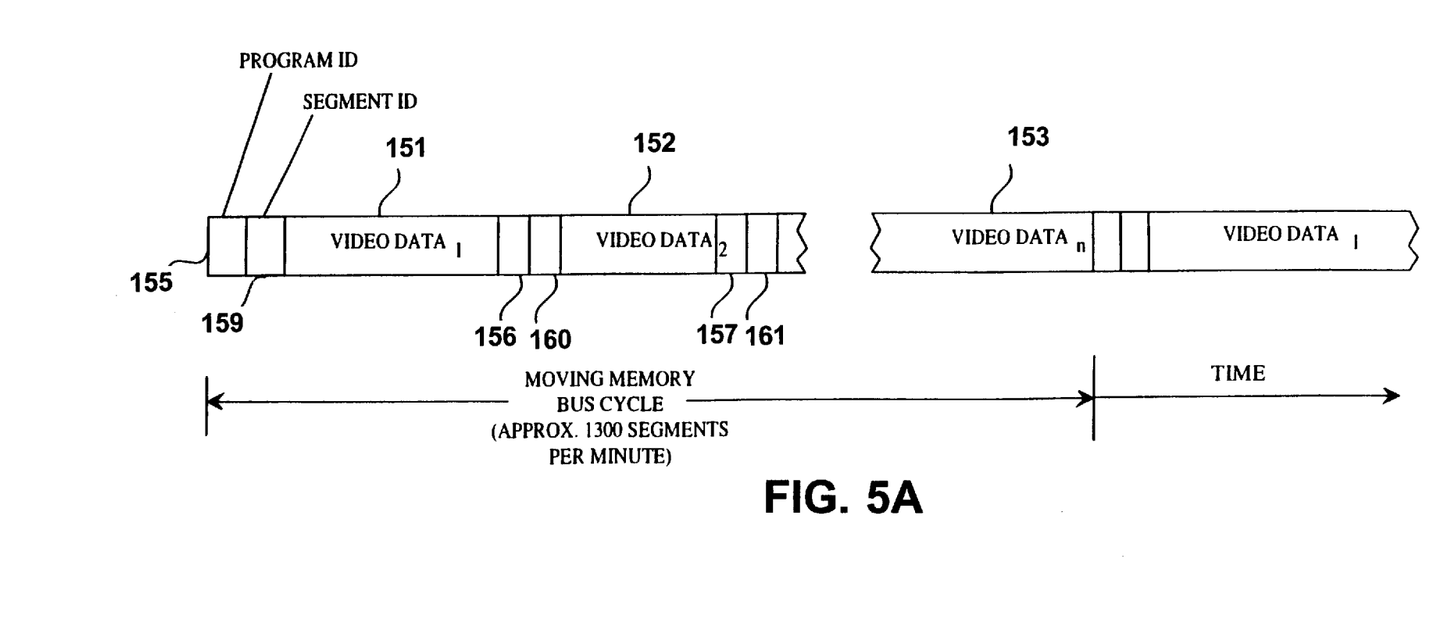

The video programs may be stored in the moving memory modules 30 in fixed, for example, one minute (11.25 Mbyte) segments. Each segment has a header which contains the program and segment address, as later described herein with reference to FIG. 5. The program segments are normally stored in sequential order, but need not be. For example, when a new program is loaded overwriting an old program, if the new program is longer than the old program, there may be a discontinuity in the sequential order of addressed locations to find additional available memory space for the new program.

Computing Microcells

Figure 7:
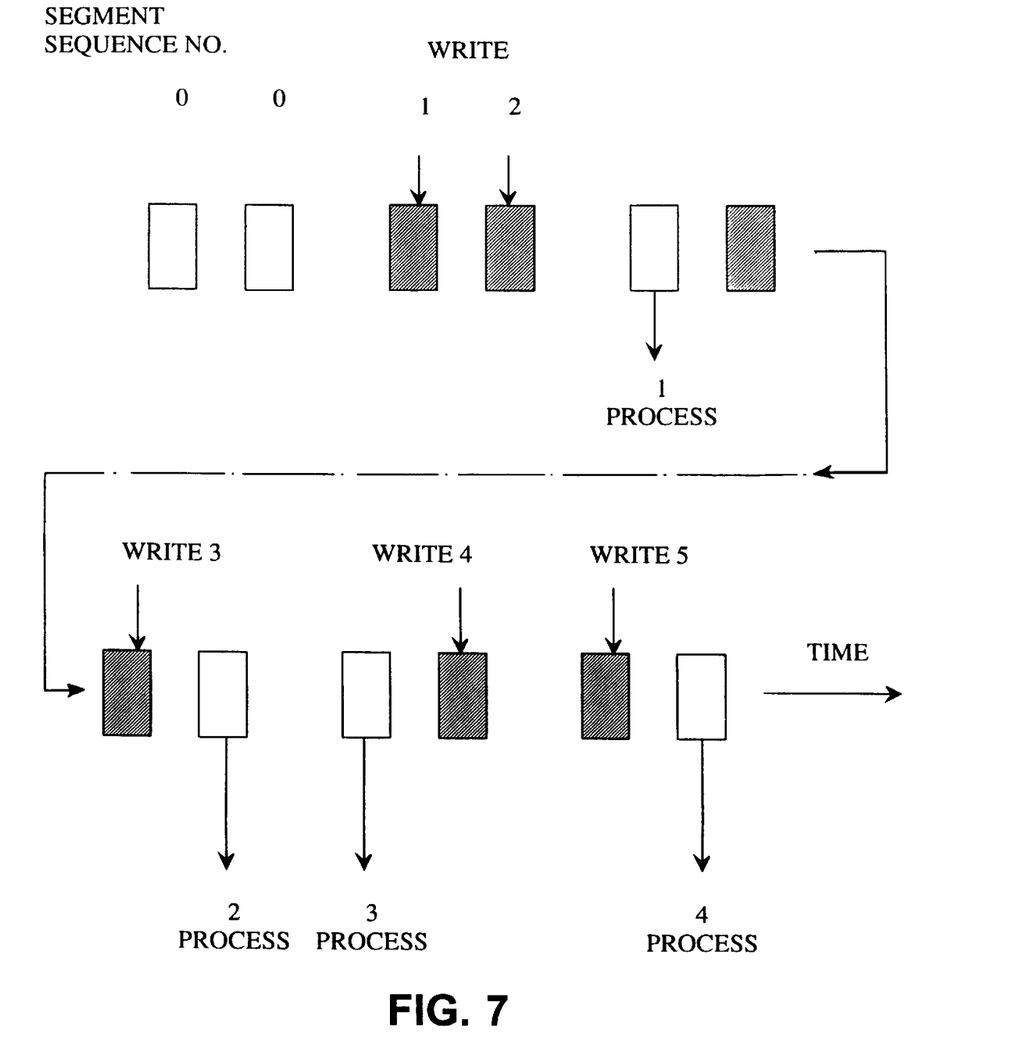
FIG. 7 is a pictorial illustration of the operation of the split buffer memory.

For each computing microcell 60 there is a bus selector switch 45 connected to the moving memory bus (MMP) 40 for selecting data that is being broadcast, or otherwise distributed in recurring cyclic manner (with other stored programs). The bus selector switch 45 is controlled by the microcell 60 to select the program address provided by the microcell access switch 70. The bus interface 50 recognizes when a desired video program segment is on the MMB 40, for example, by successfully comparing identifying header data with selection data, and writes it into a buffer memory 52. The bus interface 50 shares two 11.25 MByte memory units 52 with the computing microcell 60. While one such memory unit is reading data from the MMB 40, the other memory unit is the active working memory 52 for the computing microcell 60. Referring now to FIG. 7, there is shown a pictorial illustration of the operation of the split buffer memory 52. Initially, the buffer memory 52 is empty (at state a) when a video program is started, and two program segments are written in to fill both halves of the buffer memory 52, as shown at state b. The microcell 60 begins processing segment 1 in the buffer memory 52, as shown at state c. Of course, other multiple segmentation or splits into thirds, quarters, and the like, may also be used to facilitate alternating, sequential write and process operations of the buffer memory 52. When the computing microcell 60 has processed the data in the active working memory, it switches to the other half of the memory and the next program segment is written into the inactive half of the memory 52, as shown in states d, e, and f, in alternating, cyclic sequence. On the first MMB cycle, two program segments are read to fill the 25 MByte memory. On successive MMB cycles, only one program segment may be required to replace the program segment that has been processed. The computing microcell 60 provides the bus interface 50 with the "address" of the desired program segment, for example, via the memory 52.

Figure 3:
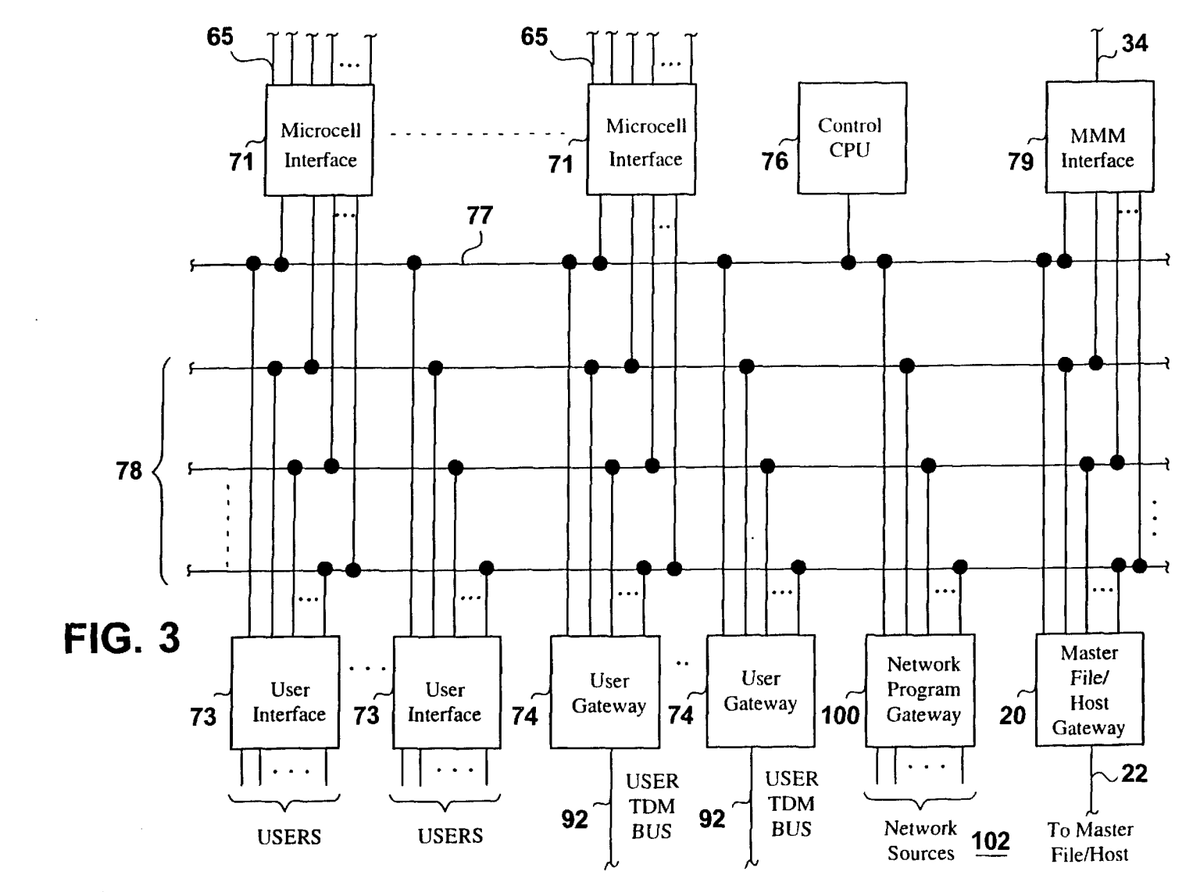
FIG. 3 is a block schematic diagram of a microcell access switch in the embodiment of FIG. 2.

The computing microcell 60 receives commands and requests for programs from the users 90 via a microcell access switch 70. When a user requests a video program that is not a network program 100, 102, the microcell access switch 70 assigns a computing microcell 60 to the user and provides a connection 80, or 92 from the user 90 to the computing microcell 60. This connection may be directly to the user or via a user gateway 74, as shown in FIG. 3, which is operated in conventional manner. The computing microcell 60 contains a 25 MByte buffer memory 52 which allows the computing microcell 60 to fast forward or reverse at twice normal speed. When it is desired to move to a new program segment without continuously viewing the sped up video presentation, the moving memory bus interface will have to wait for the new program segment to appear on one of the moving memory buses which would be an average time of one half of the MMB cycle time and therefore the move is accomplished in an average time of about 30 seconds. In the foregoing description of the system operation, the video programs were divided into segments and the segments were stored in sequential order.

Figure 6:
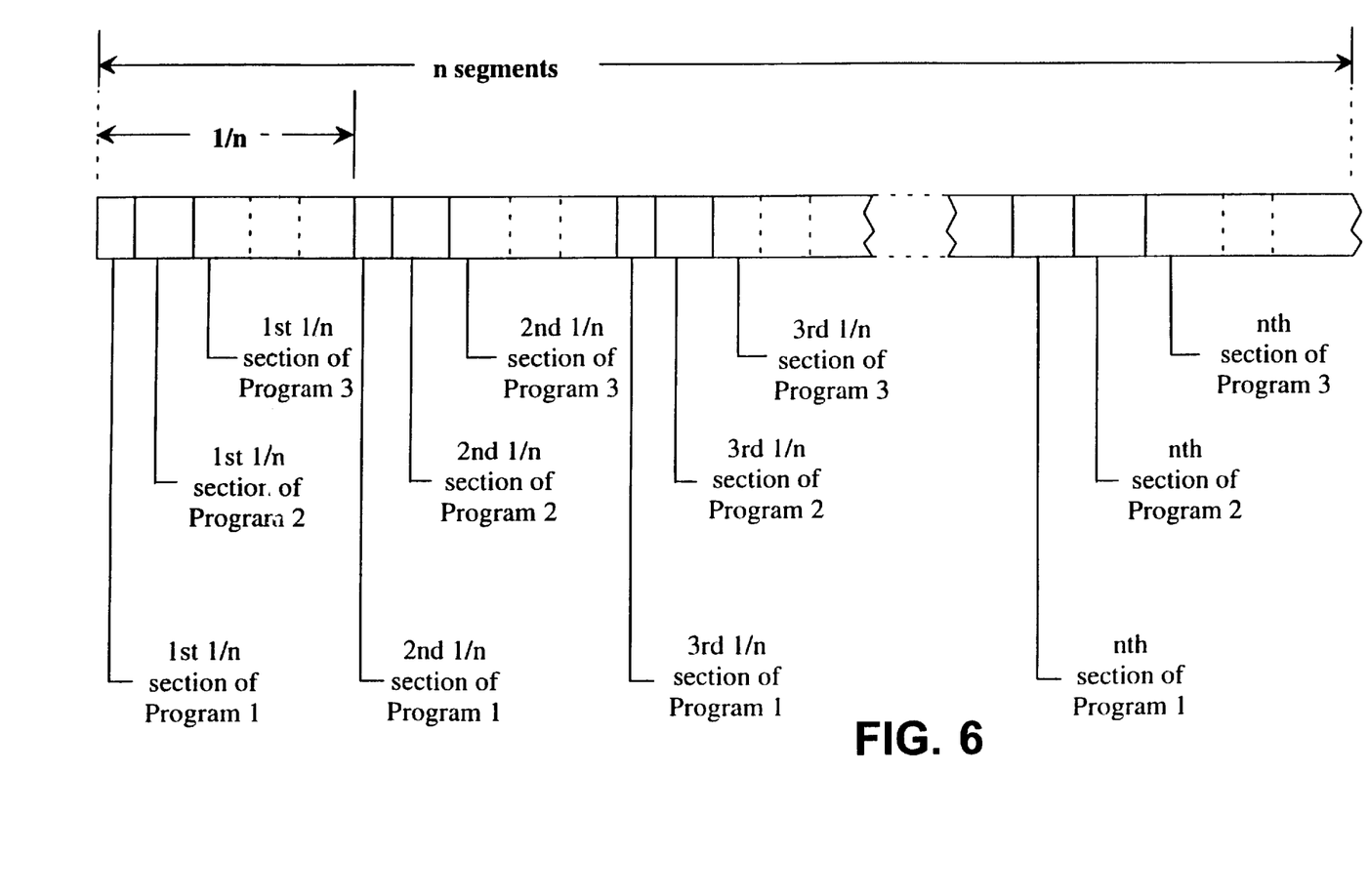
FIG. 6 is a pictorial illustration of segmented programs in a moving memory cycle according to the present invention.

In accordance with another embodiment as illustrated in FIG. 6, a given video program may be distributed throughout a moving memory cycle to provide an effective shorter bus cycle. For example, if the bus cycle is divided into 10 sections, the first program segment of a video program can be stored in section 1, the second program segment in section 2 at a location 1/10 of the way through the moving memory bus cycle, the third program segment in section 3 at a location 2/10 of the way through the moving memory bus cycle, and so on, with the 11th program segment in section 1. Because of the split buffer memory 52, the order of appearance of program segments in any one section is not important. This technique has the effect of reducing the time between program segments by a factor of 10. Using this technique, the sizes of the buffer memories in the example given above may be reduced by a factor of 10, so the shared memories 52 may be 2.5 Mbytes.

The computing microcell 60 also records user activity for billing purposes and forwards this information to the master file/host computer 11 via the master file/host gateway 20.

Depending on user statistics, there may not need to be as many computing microcells 60 as there are users 90. Typically, a maximum of 10 to 20% of the users 90 may use the video on demand system at any given time. Those users who access network programs will not need a computing microcell 60. Therefore, a 10,000 user system may only require on the order of 2,000 computing microcells 60.

Microcell Access Switch

Microcell Access Switch Function:

The microcell access switch 70 is the primary control and communication component of the system. The microcell access switch 70 contains the CPU 76 which performs the control functions, and the video switching buses 78 which perform the communication functions. The microcell access switch 70 maintains the system status including which computing microcells 60 are available, and including a table that lists the video programs which are in the moving memory modules 30, along with their address on the moving memory bus cycle. When a user 90 requests an interactive service which requires a computing microcell 60, the microcell access switch 70 assigns a computing microcell 60 to the user and establishes a connection from the user to the computing microcell. When the user is finished with the service, the computing microcell 60 and connections are released. The microcell access switch 70 also maintains a list of the video programs in the moving memory modules 30. If a user 90 requests a video program that is not in the MMM, the microcell access switch 70 obtains the program from the host computer via gateway 20 and data link 22, and loads it into the MMM 30 via MMM interface 79 and data link 34.

Microcell Access Switch Description:

Referring now to FIG. 3 for a detailed description of the microcell access switch 70, there is shown a block diagram including a number of microcell interfaces 71 that are each connected 65 to an associated microcell 60 and including a network program gateway 100, a number of user interfaces 73, a number of user gateways 74, a master file/host gateway 20, a control CPU 76, a signaling and command bus 77, a number of video switching buses 78, and a moving memory module interface 79 that is connected 34 to a moving memory module 30.

Microcell Access Switch Operation:

A user 90 requests service via a user interface 73, or user gateway 74, and signaling and command bus 77 to the control CPU 76. The control CPU 76 assigns a microcell 60 to the user 90 via the signaling and command bus 77. The microcell 60 obtains the desired video program via the MMM 30, as shown in FIG. 2 and FIG. 4. The control CPU 76 provides a connection from the microcell 60 to the user 90 by assigning a timeslot on one of the video switch buses 78. As an example, the video switch buses 78 may operate at a data rate of 250 Mbit per second which would provide 166 video connections of 1.5 Mbit per second, as illustrated in FIG. 5B. A switch with a capacity of 2,000 connections requires 12 video switch buses 78. The microcell access switch 70 can also transfer data from the master file/host 11 to the moving memory modules 30. The master file/host gateway 20 places video data obtained from the master file 11 in a cycling timeslot on the video switching bus 78 assigned to transfer the program data to a moving memory module 32 via the MMM interface 79.

There are two techniques used to connect users to the system, namely, via the user interfaces 73 or via the user gateways 74. The user interfaces 73 contain channels for each user 90. The user interface selects the data from the assigned timeslot on the video switch bus 78 and transmits it to the user 90. The user interface 73 also transmits and receives signaling and command data to and from the user via the signaling and command bus 77. The user gateway 74 provides communication with the user 90 via a high-speed, serial time-division multiplexed (TDM) bus 92. The user gateway 74 selects data from the assigned timeslot on the video switch bus 78 and places it into the cycling timeslot on the user TDM bus 92 assigned to the desired user. A number of users 90 on a TDM bus 92 then access their individual video program selections within the serial or cycling timeslots assigned specifically to each such users 90.

User Set Top Interfaces

There are two types of user set top interfaces 94, namely, a direct-connected set-top interface as shown in FIG. 2, and a set-top interface for use with the User Gateway 74 via TDM Bus 92, as shown in FIG. 3. The direct-connected set top interface is adapted to convert the 1.5 Mbit data stream into a video program for display on the user's set 90. The direct-connected set-top interface also contains an interface with a 64 Kbit per second reverse channel used to send commands to the video-on-demand system, and contains an input device (e.g., a keyboard) for the user to input the commands.

The user gateway connected set-top interface is adapted to select one of the time slots preassigned to a network program or a time slot assigned to the user to receive video-on-demand programs. The user gateway connected set-top interface also is adapted to convert the 1.5 Mbit data stream into a video program for display on the user's set 90, and includes an input device for the user to input commands, and is also adapted to transmit the commands to the video-on-demand system via a 64-kbit reverse channel on the TDM bus 92. A time slot is assigned to the user to receive video-on-demand by the microcell access switch 70 when the user requests service. The microcell access switch may signal the identity of the assigned time slot to the user by placing a special code such as all ones in the time slot to be assigned and then placing the user's ID number in the next occurrence of the assigned time slot.

Network Program Distribution

A network program gateway 100 provides an interface between the analog video network programs and the Video Distribution System by converting the network programs into the 1.5 Mbit compressed digital form corresponding to the MPEG-I standard and formatting the digital data into packets suitable for switching via the video switch bus 78. The microcell access switch 70 switches any real-time video program, such as a network broadcast program, directly to a user 90 via the video switch bus 78 and user interface 73 or user gateway 74 without involving interactive aspects of the video on demand system. Since many users on one very high speed link 92 may be watching the network programs, all of the network programs can be pre-assigned individual time slots on the time-division multiplexed data link. The user 90 thus can select a network program by selecting one of the pre-assigned time slots to receive the broadcast video program data. Depending on user statistics, there may be more users than time slots in each very high speed data link 92, requiring time slots to be assigned to the user by the microcell access switch 70. Thus, when the user 90 desires a program that is being broadcast in real time, the user's set-top unit 94 selects the desired time slot that has been preassigned to the desired network program, reads the data from the time slot, and converts the compressed data into an analog signal suitable for display on a conventional television set.

The network program gateway 100 receives a feed 102 of network programs and places them in preassigned time slots on the video switch bus 78. The user gateway 74 selects data from the timeslots assigned to each network program and places it in the assigned time slot of the user TDM bus 92.

Figure 4:
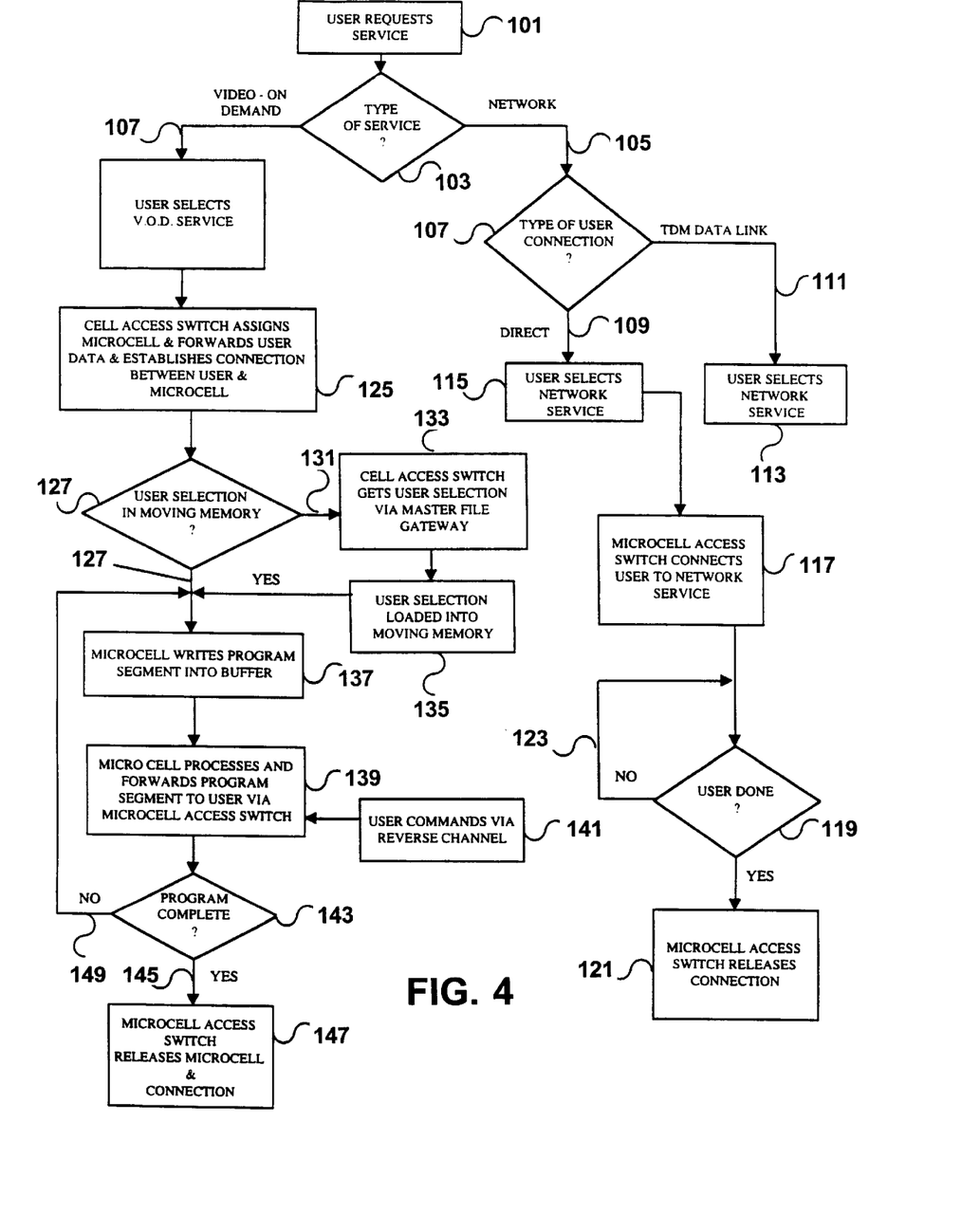
FIG. 4 is a flow chart illustrating operation of the present invention.
Figure 5B:
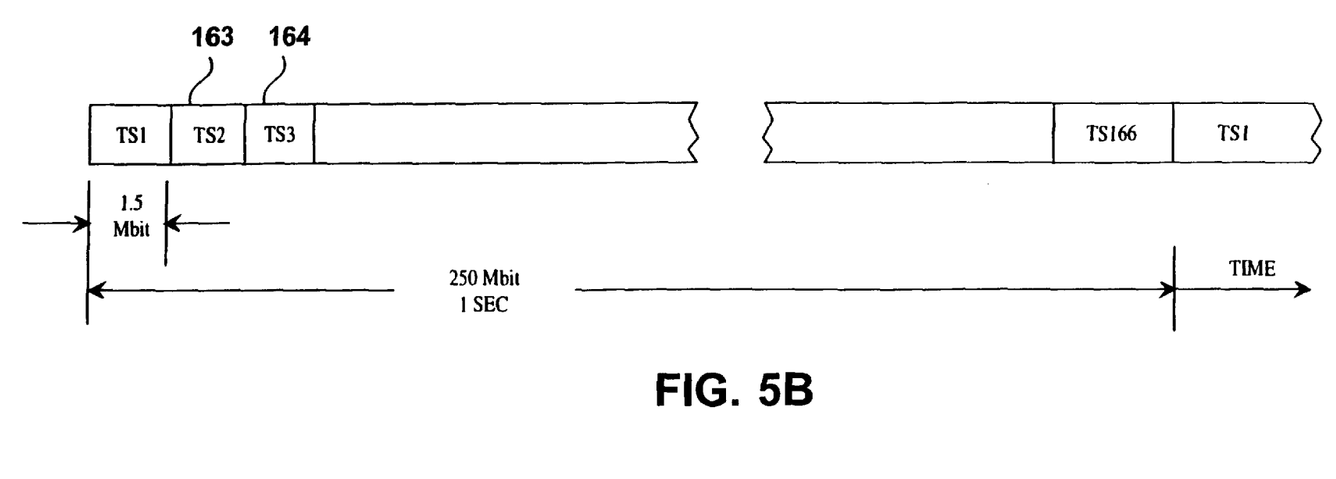

Referring now to FIG. 4, there is shown a flowchart of the operation of the present invention. A request 101 by a user for service is determined 103 to be a selection either of network programs 105 (over which user may have no control as to start time and pause, and the like), or of video-on-demand 107.

Selection 103 of network programs for the present invention provides compatible operation on different types of user connections 107, including direct connection 109 (for example, via connection 80 of FIG. 2) and TDM data link connection 111 (for example, connection 92 previously described with reference to FIG. 2). For the latter type of user connection (i.e., via TDM data link), the user simply selects 113 the network service and the set top unit selects the required time slot on the TDM data link, as previously described.

For the direct user connection 109, the user selects 115 the network service and the microcell access switch 70 connects the user 117 to the network service, for example, via the network program gateway 100 to the network programs 102. When the user no longer desires the service of the video distribution system and, for example turns off his receiver, the set top unit sends a signal to the microcell access switch 70 which disconnects or releases 121 the user connection. A connection 123 is thus retained until later determined that the user is done with the connection.

A network program gateway 100 switches any real time video program, such as a network broadcast program, directly to a user without involving the interactive video on demand system. Since many users on one very high speed link may be watching the network programs, the network programs can be pre-assigned a time slot on the time division multiplexed data link. The user can select a network program by selecting one of the pre-assigned time slots to receive the video program data. Depending on user statistics, there can be more users than time slots in each very high speed data link.

The network program gateway 100 receives network programs 102 and places them in preassigned time slots on a video switch bus. The user gateway takes data from the timeslots assigned to each network program and places it in the assigned time slot of the user TDM bus.

When a user requests 101 video-on-demand 107, the microcell access switch 70 assigns 125 a computing microcell 60 to the user, forwards the user data to the computing microcell 60, and establishes a connection between a user 90 and a computing microcell 60. On the basis of the user data transferred on the reverse communication bus, the user's selection is determined 127, 129 to be in the moving memory modules 30, 32, or is determined to be required 131 from the master files 11. For retrieval of a user's selection from the master files 11, the microcell access switch 70 connects 133 the master file gateway 20 and the moving memory modules 30, 32 via channels 22, 34 to load 135 the user's selection into the moving memory modules 30, 32.

The user's selection in the moving memory modules 30, 32 repetitively cycles on one or more of the moving memory buses 40, and the assigned microcell 60 selects and writes 137 one or more program segments from the bus(es) 40 into the buffer memory 52 via bus interface 50.

The microcell 60 processes and forwards program segments 139 (for example, via shorter subsegments, compressed program data, and the like) to the designated user 90 via the connection thereto through the microcell access switch 70. Various user commands (such as fast forward, pause, and the like) may be communicated 141 from the user 90 to the microcell 60 via reverse communication channel or bus to control the delivery of the program selection to the user, as the user may elect.

When the user no longer desires the service of the video distribution system, and, for example turns off his receiver, the set top unit sends a signal to the microcell access switch 70 which releases 147 the connection between the user 90 and the assigned microcell 60. Otherwise, the connection is retained for release at a later time when the program delivery to the user is complete.

Referring now to FIG. 5A, there is shown a pictorial representation of the data format present on the moving memory buses 40. Specifically, each video data segment 151–153 may include a segment of a program along with the program identification code 155–157 and the segment identification code 159–161 for that segment of that program. In a typical moving memory bus cycle, about 1300 segments including associated identification codes (aggregating about 11.25 Mbytes per segment) may be transferred or distributed per minute and then repeated in recurring cyclic manner.

Referring now to FIG. 5B, there is shown a pictorial representation of the protocol or time-division multiplexed segments of format of data on the video switch bus 78. This format or protocol for data distribution illustrates an example of about 166 time slots 163, 164 per second in which each time slot 163, 164 that may be assigned to user interfaces 73 or gateways 20, 74, 100 may contain 1.5 Mbits of data for transfer to a user per second, i.e., in each recurring cycle of 166 allocable time slots per second.

Figure 5C:
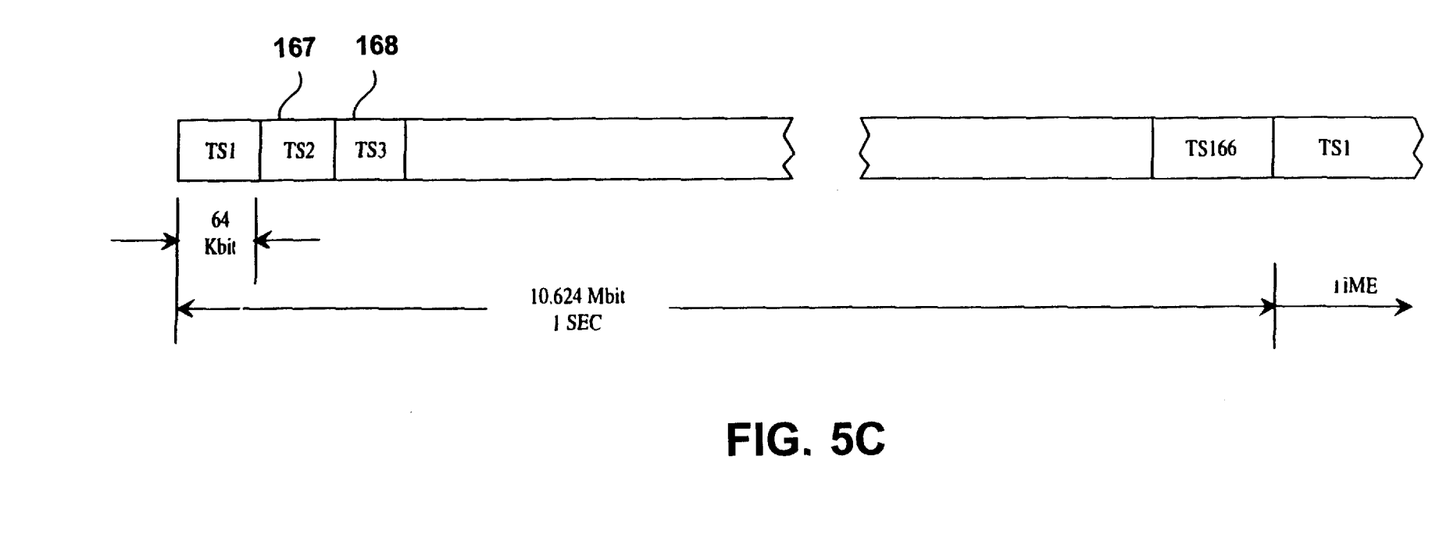

Referring now to FIG. 5C, there is shown a pictorial representation of the protocol or data format used on the signaling and command bus 77. In this data format, 166 time-division segments 167, 168 may be multiplexed per second for transferring interactive signaling and commands, for example, from a user 90 that is allocated a particular time segment to an assigned microcell 60 via a user interface 73 or user gateway 74.

Therefore, the system and method of the present invention provides simultaneous and interactive access for multiple users to programs, such as audio or video performances and video games, by repetitively cycling the read-out and distribution of the contents of mass memory containing the video and audio programs onto moving memory buses from which sequential segments may be identified and written into local buffer memory for distribution to designated users at rates of consumption (e.g. via start, fast forward, pause) under controls of the individual users. In addition, compatible operation on standard broadcast programs facilitates the servicing of greater numbers of individual users by freeing up interactive system operations for users requiring such operational capability.

What is claimed is:

1. An on-demand video distribution system for multiple users at a remote location comprising:

data storage for storing multiple digital encoded video programs to be transferred to the users;

a controller coupled to the data storage for repetitively reading the contents of at least one portion of the data stored in the data storage in a cyclic manner with a repeating data distribution cycle;

a plurality of microcells for processing user commands and connected to receive and interact with video programs for distribution to the users at remote locations;

a plurality of buses interconnecting the data storage and the plurality of microcells for providing thereto the data read from the data storage in a cyclic manner during each repeating data distribution cycle;

said controller disposed to sequentially and repetitively transmit on the plurality of buses said data independently of requests therefor;

a microcell access switch selectively coupling one of the plurality of microcells to one of the multiple users for operative interaction with a selected video program; and wherein said microcell access switch includes a plurality of signal ports at which the plurality of microcells and one of the multiple users are connected, and said microcell access switch includes a processor coupled to the signal ports for controlling the coupling of the plurality of user stations with the plurality of computing units in response to said user commands.

2. The on-demand video distribution system according to claim 1 wherein the microcell access switch includes bus means interconnecting a microcell at the selected location and a plurality of the multiple users at remote locations in time-division multiplexed manner to supply said multiple video programs to ones of the multiple users substantially simultaneously over the bus means.

3. The on-demand video distribution system according to claim 2 wherein the microcell access switch includes a processing unit coupled to receive commands from a number of said multiple users for selecting video programs from the plurality thereof in the data storage.

4. The on-demand video distribution system according to claim 3 wherein the data distribution cycles are divided into a plural number, n, of sections and the video programs are divided into a plural number of segments, with a first of the plural number of program segments being distributed in a first section of the data distribution cycle, and with a second of the plural number of the program segments being distributed in a second section of the data distribution cycle which is 1/n advanced in the data distribution cycle, and continuing in similar array to the nth program segment which is distributed in the nth section of the data distribution cycle, and continuing thereafter to the n+1th program segment distributed in the first section of the data distribution cycle, and continuing in similar manner for the entire program stored in the data storage.

5. The on-demand video distribution system according to claim 2 comprising:

a network program interface coupled to receive broadcast network programs for converting the format thereof to format for application to the microcell access switch for selective distribution along the bus means to ones of the multiple users at remote locations.

6. The on-demand video distribution system according to claim 5 wherein the network program interface converts the format of a received broadcast network program to data in time-division multiplexed format within a predetermined time slot therein for distribution through the microcell access switch and bus means to one of the multiple users.

7. A method for distributing video programs on demand to multiple users at remote locations in a system including data storage for storing multiple digital encoded video programs to be transferred to ones of the multiple users and including microcells at a selected location for processing user commands and selected video programs, the method comprising the steps of:

repetitively reading the contests of at least one portion of the data stored in the data storage in a cyclic manner with a repeating data distribution cycle and sequentially and repetitively transmitting to said microcells said at least one portion of the data stored in the data storage independently of requests therefor;

activating a microcell at the selected location to operatively interconnect one of the multiple users at a remote location with a selected stored video program in response to the user's commands for providing successive portions of the data read from the data storage in cyclic manner to one of the multiple users at a remote location during each repeating data distribution cycle;

providing a microcell access switch having multiple switch ports;

assigning a first microcell access switch port to one of the multiple users and assigning a second microcell access switch port to one of the multiple users; and creating a communication pathway between said first and second microcell access switch ports to selectively couple one of the multiple users to one of the plurality of microcells for operative interaction with a selected video program in response to said user commands.

8. The method for on-demand video distribution according to claim 7 comprising the step of:

interconnecting a microcell and a plurality of users in time-division multiplexed manner to supply multiple video programs to a plurality of said multiple users substantially simultaneously.

9. The method for on-demand video distribution according to claim 8 for distributing broadcast network programs, the method comprising the steps of:

converting the format of broadcast network programs to format for application to the microcell access switch for selective distribution therethrough to users.

10. The method for on-demand video distribution according to claim 9 wherein the step of converting a broadcast network program includes the step of:

converting the format of a broadcast network program to data within a predetermined time slot in time-division multiplexed format for distribution through the microcell access switch to one of the multiple users.

11. The method for on-demand video distribution according to claim 7 comprising the step of:

dividing the data distribution cycle into a plural number, n, of sections and dividing the video program into a plurality of segments, with a first of the plural number of program segments distributed in a first section of the data distribution cycle, and with a second of the plural number of the program segments distributed in a second section of the data distribution cycle which is 1/n advanced in the data distribution cycle, and continuing in similar array to the nth program segment which distributed in the nth section of the data distribution cycle, and continuing thereafter to the n+1th program segment distributed in the first section of the data distribution cycle, and continuing in similar manner for the entire video program stored in the data storage.

\* \* \* \* \*